(12) United States Patent
Ahn

(10) Patent No.: US 7,882,270 B2
(45) Date of Patent: Feb. 1, 2011

(54) SHADOW COMMUNITY PRODUCING SYSTEM MATCHED TO A VARIABLE AREA OF AN INTERNET BASE AND METHOD OF THE SAME

(76) Inventor: Ki-Soon Ahn, #102-1303 Doosan Apt. 2024, Sinheung-dong, Sujeong-gu, Seongnam-si, Gyeonggi-do (KR)

( * ) Notice: Subject to any disclaimer, the term of this patent is extended or adjusted under 35 U.S.C. 154(b) by 686 days.

(21) Appl. No.: 11/912,466

(22) PCT Filed: Apr. 24, 2006

(86) PCT No.: PCT/KR2006/001529

§ 371 (c)(1),
(2), (4) Date: Oct. 24, 2007

(87) PCT Pub. No.: WO2006/115357

PCT Pub. Date: Nov. 2, 2006

(65) Prior Publication Data

US 2009/0012964 A1    Jan. 8, 2009

(30) Foreign Application Priority Data

Apr. 25, 2005    (KR) ...................... 10-2005-0034189

(51) Int. Cl.
*G06F 15/16* (2006.01)
*G06F 12/00* (2006.01)
(52) U.S. Cl. ........................................ 709/250; 707/10
(58) Field of Classification Search ......... 709/217–218, 709/225–229, 250; 707/10, 100
See application file for complete search history.

(56) References Cited

U.S. PATENT DOCUMENTS

| | | | | |
|---|---|---|---|---|
| 2002/0049832 | A1* | 4/2002 | Ullman et al. | 709/218 |
| 2006/0179061 | A1* | 8/2006 | D'Souza et al. | 707/10 |
| 2006/0184608 | A1* | 8/2006 | Williams et al. | 709/203 |
| 2007/0174691 | A1* | 7/2007 | D'Souza et al. | 714/13 |
| 2007/0218900 | A1* | 9/2007 | Abhyanker | 455/435.1 |

FOREIGN PATENT DOCUMENTS

WO    WO 2006/115357    11/2006

* cited by examiner

*Primary Examiner*—Zarni Maung
(74) *Attorney, Agent, or Firm*—Seyfarth Shaw LLP

(57) ABSTRACT

The present invention provides a shadow community producing system matched to a variable area of an internet base and a method of the same, which allows users connecting with unspecified web sites of an internet base to arbitrarily and automatically construct a community area in the web sites in real time, and allows a number of third parties connecting to the web sites to confirm creation information regarding the community and access to the community area, thereby enhancing convenience and consistency in information sharing. The present invention has advantages in that it allows users to create shadow communities matched with URLs on all areas accessible through the user's terminals regardless of web site producing companies, thereby sharing objective information with many and unspecified users; allows users to freely create and manage shadow communities for web sites not having communities, categories, and products.

10 Claims, 10 Drawing Sheets

[Fig. 1]
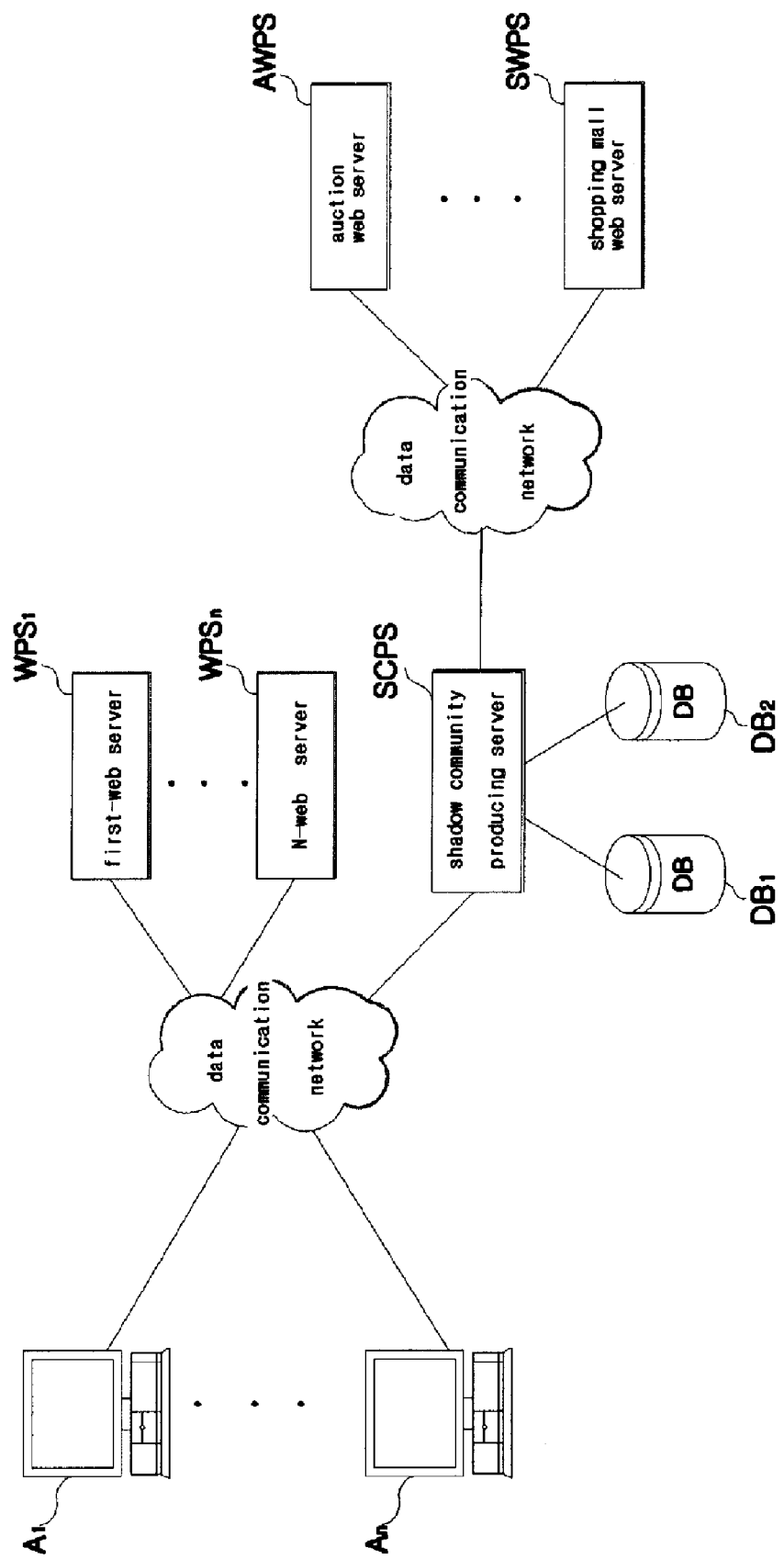

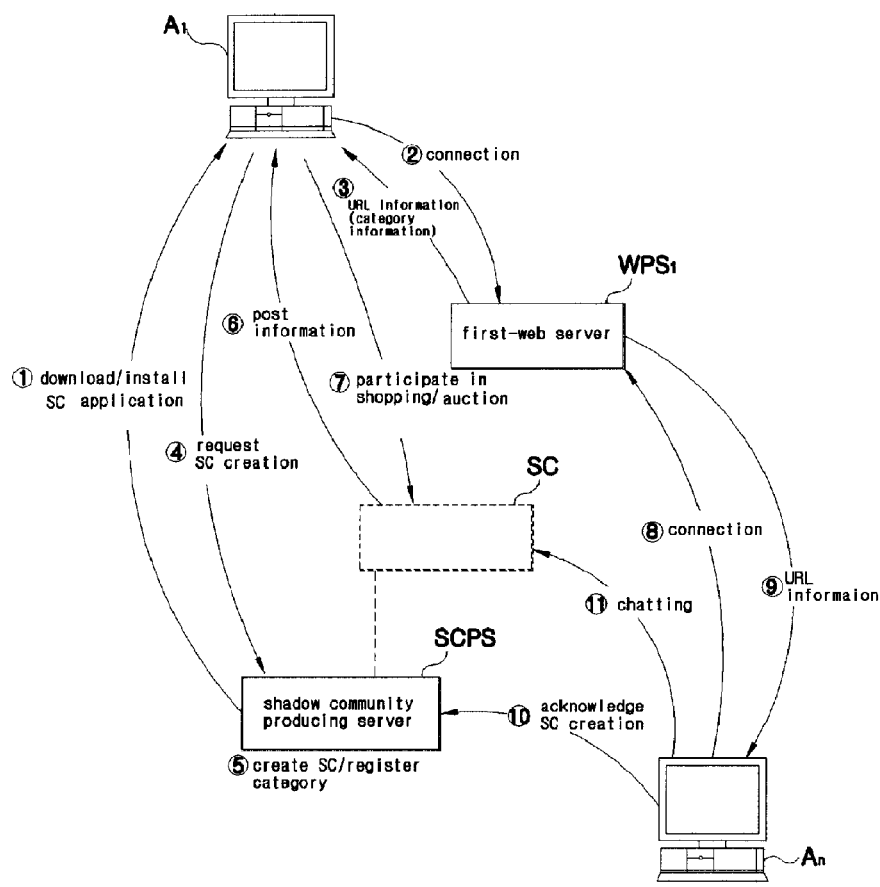
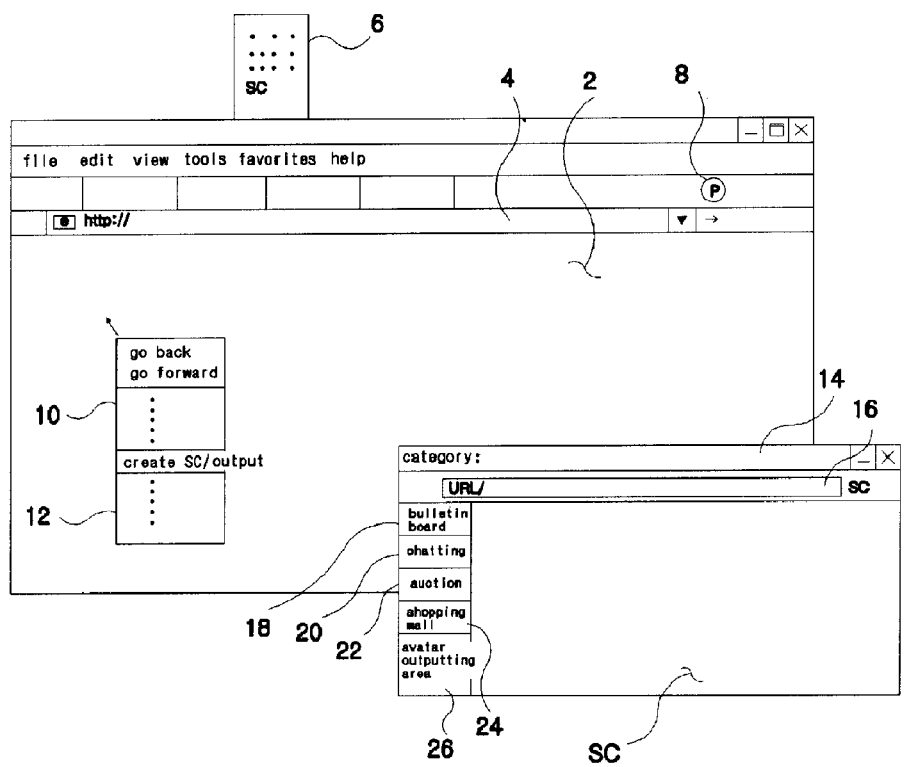

[Fig. 4]
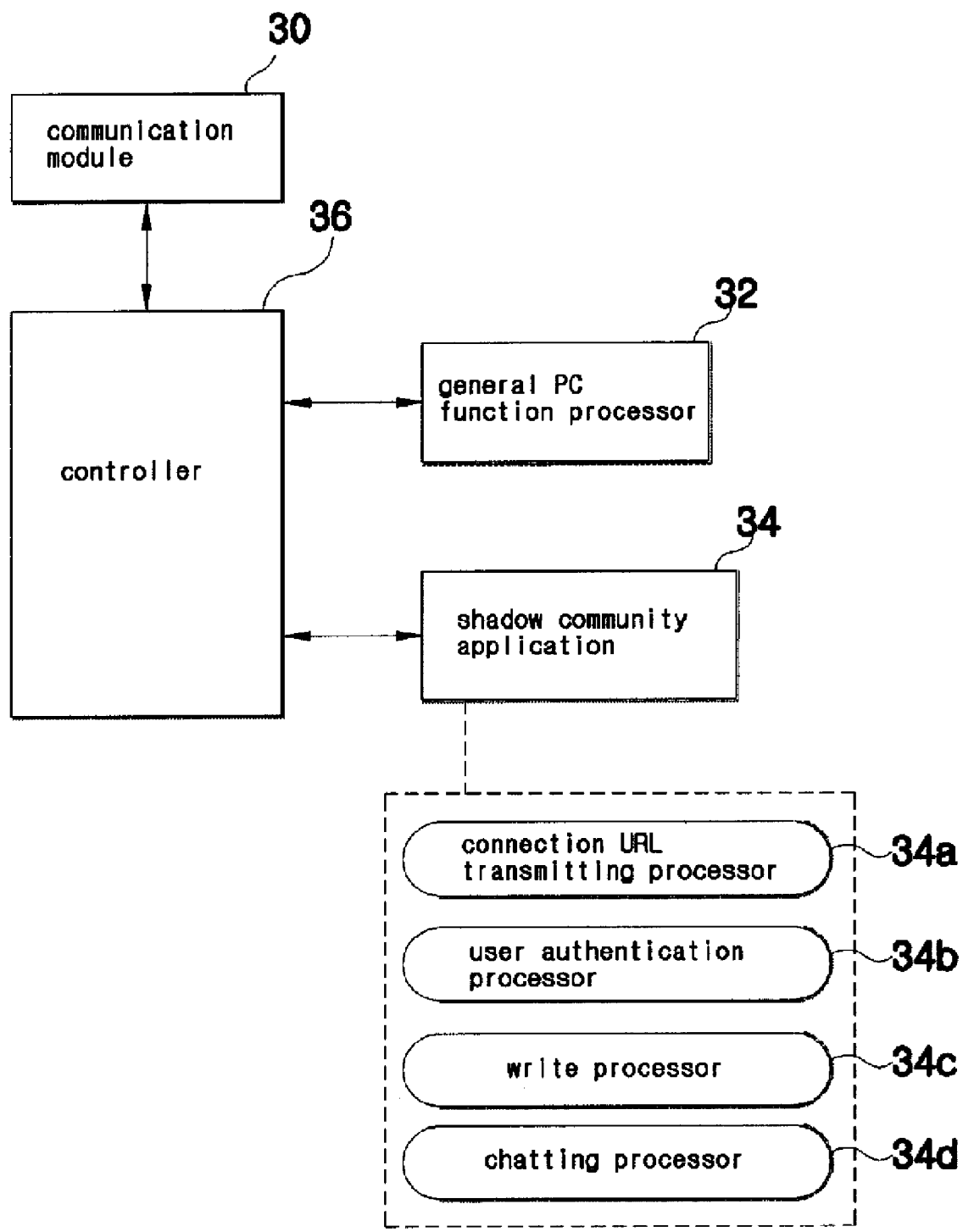

[Fig. 5]
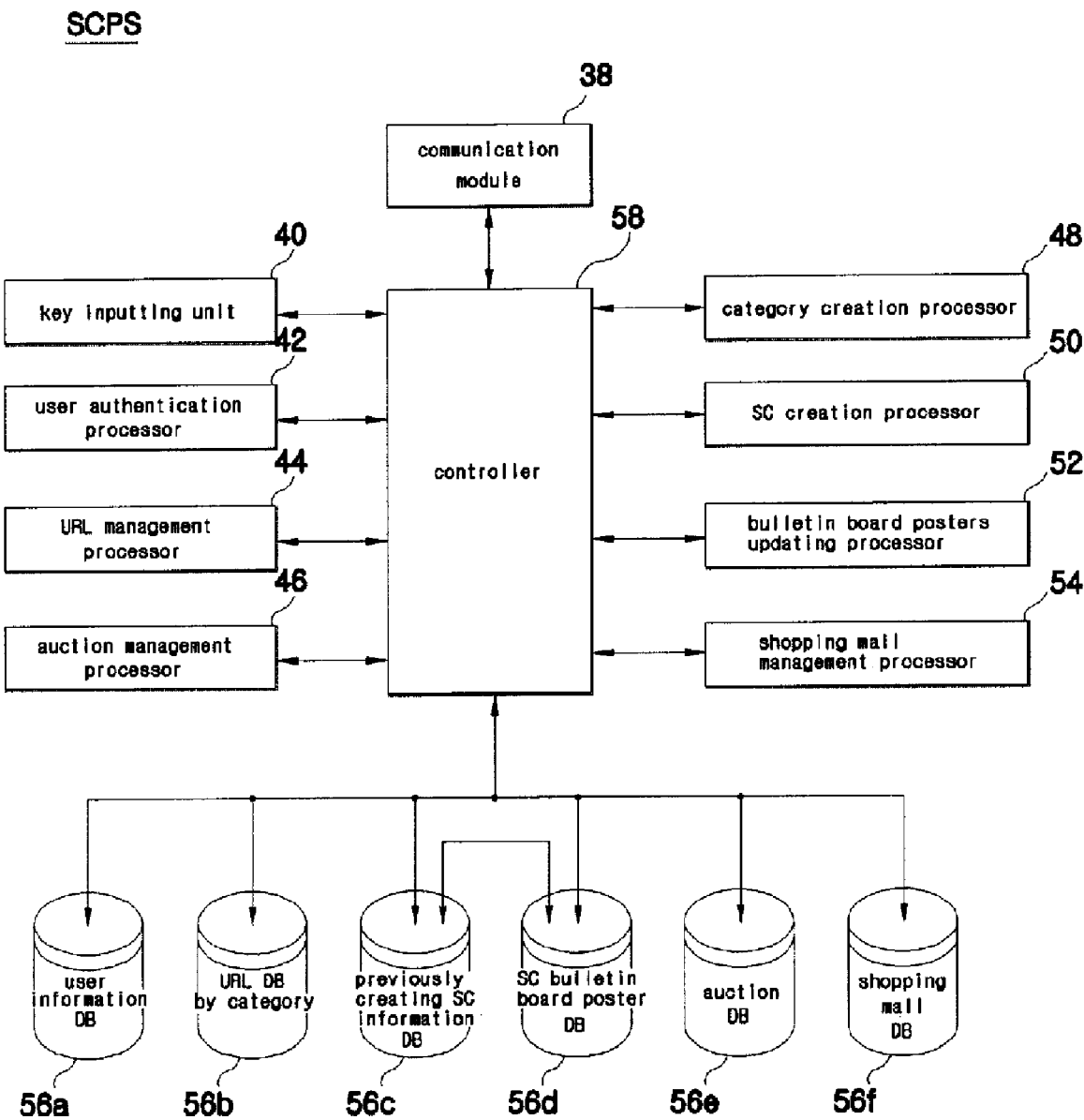

[Fig. 6]
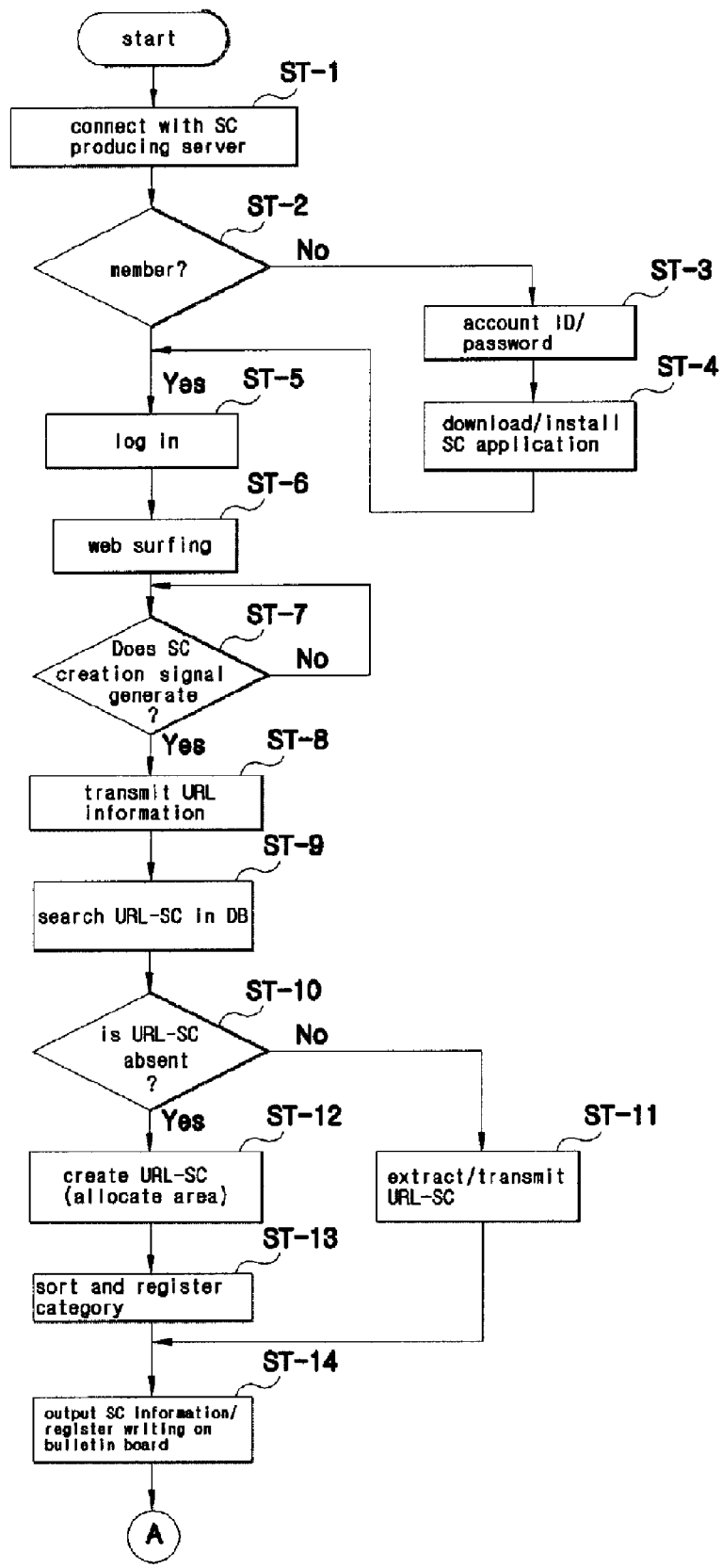

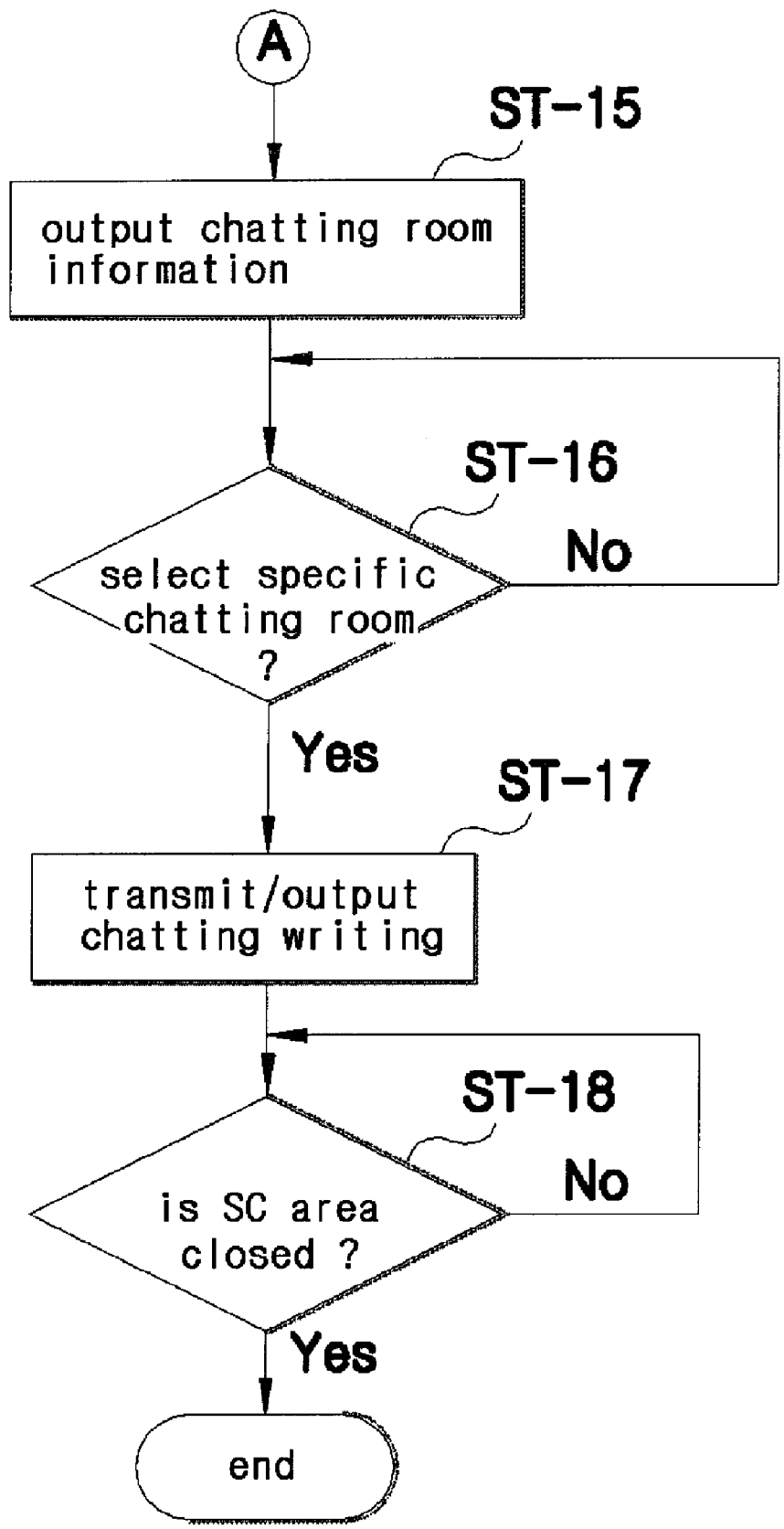
[Fig. 7]

[Fig. 8]
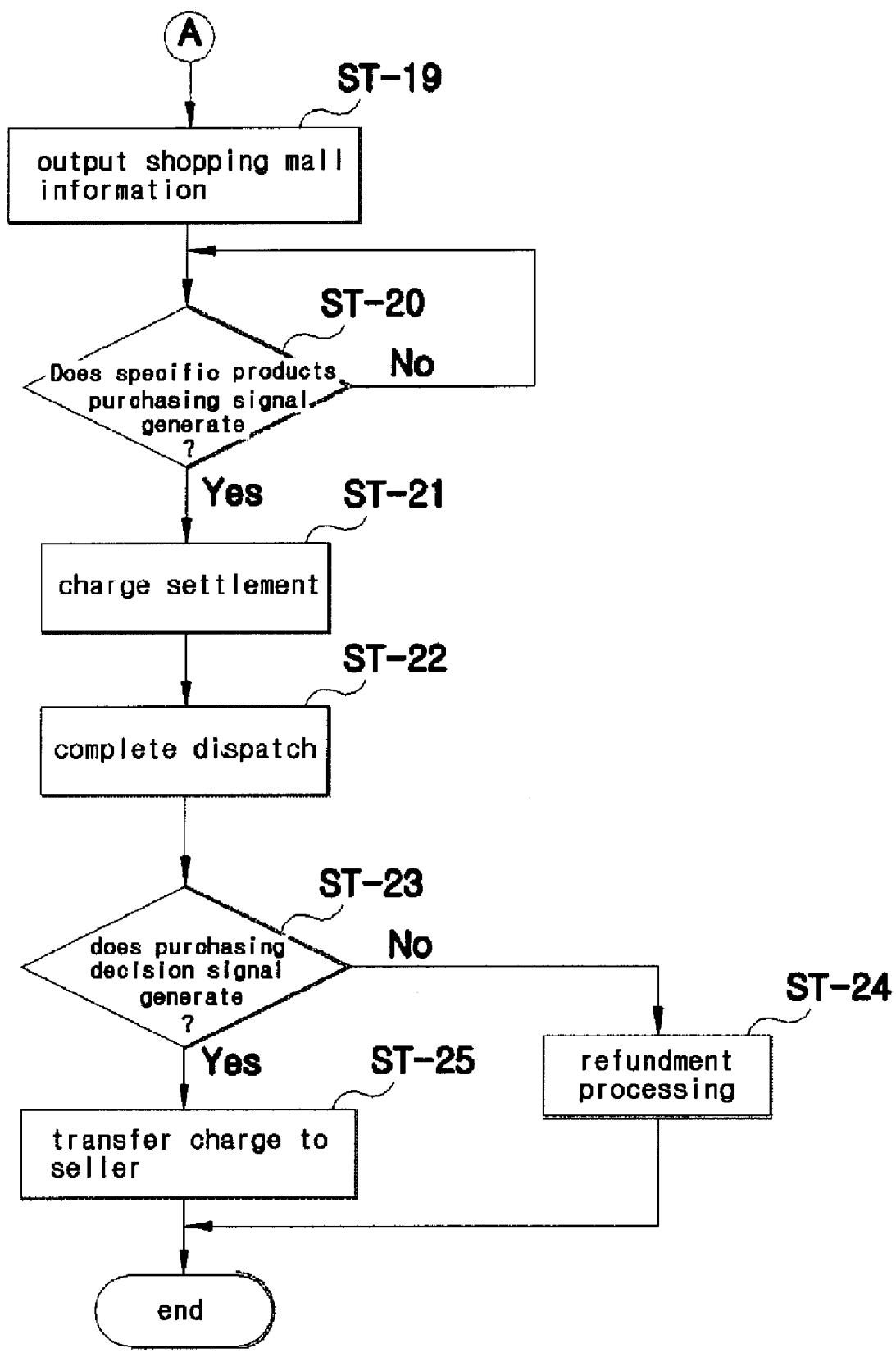

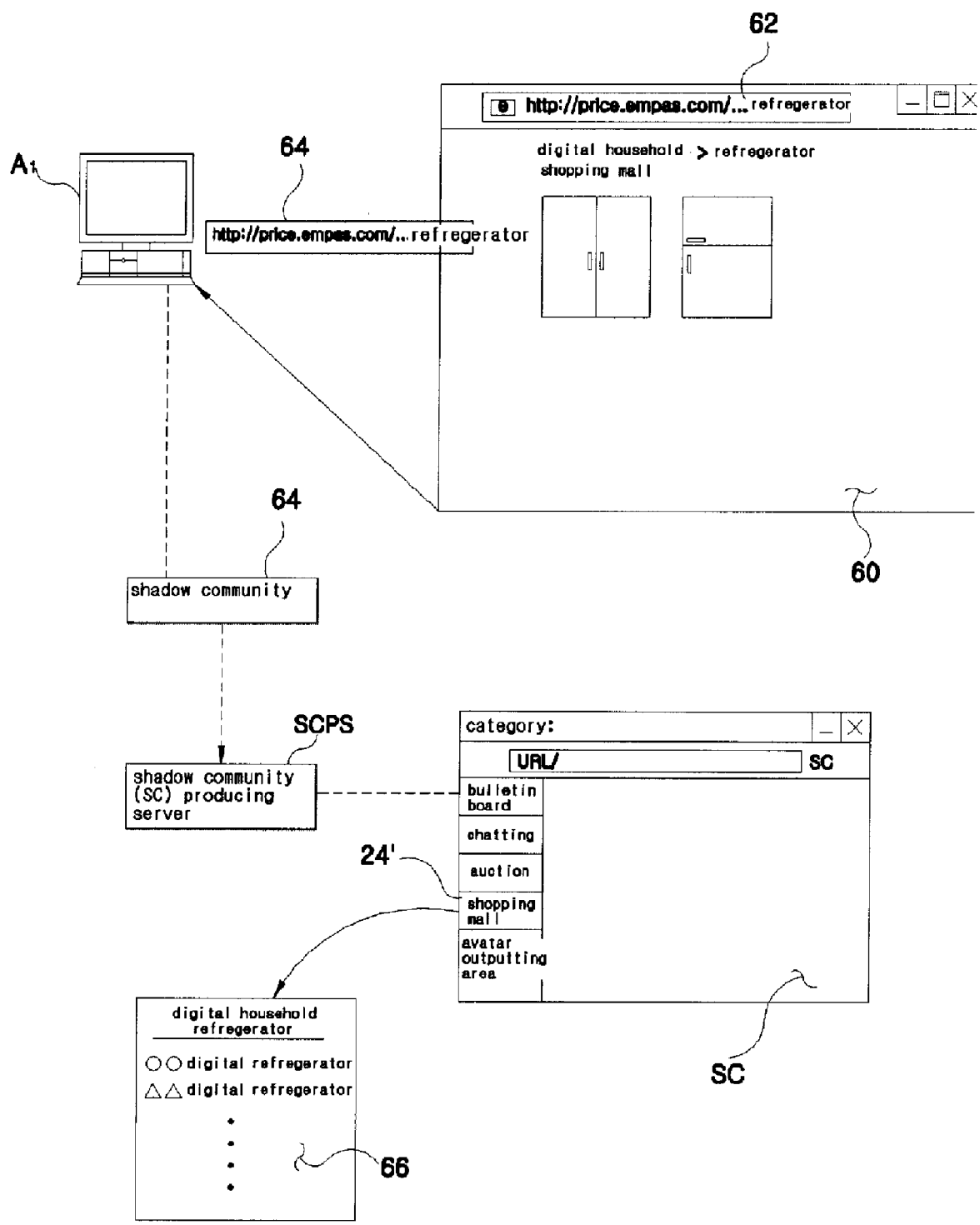
[Fig. 9]

[Fig. 10]
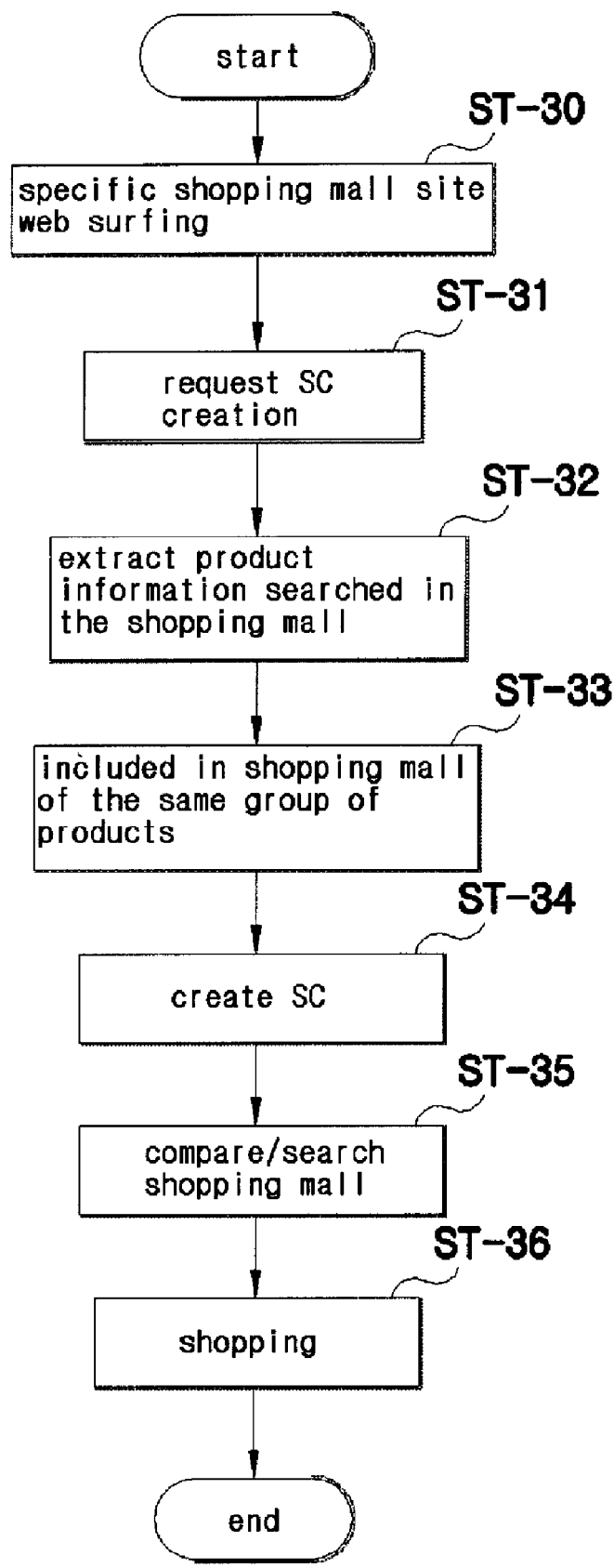

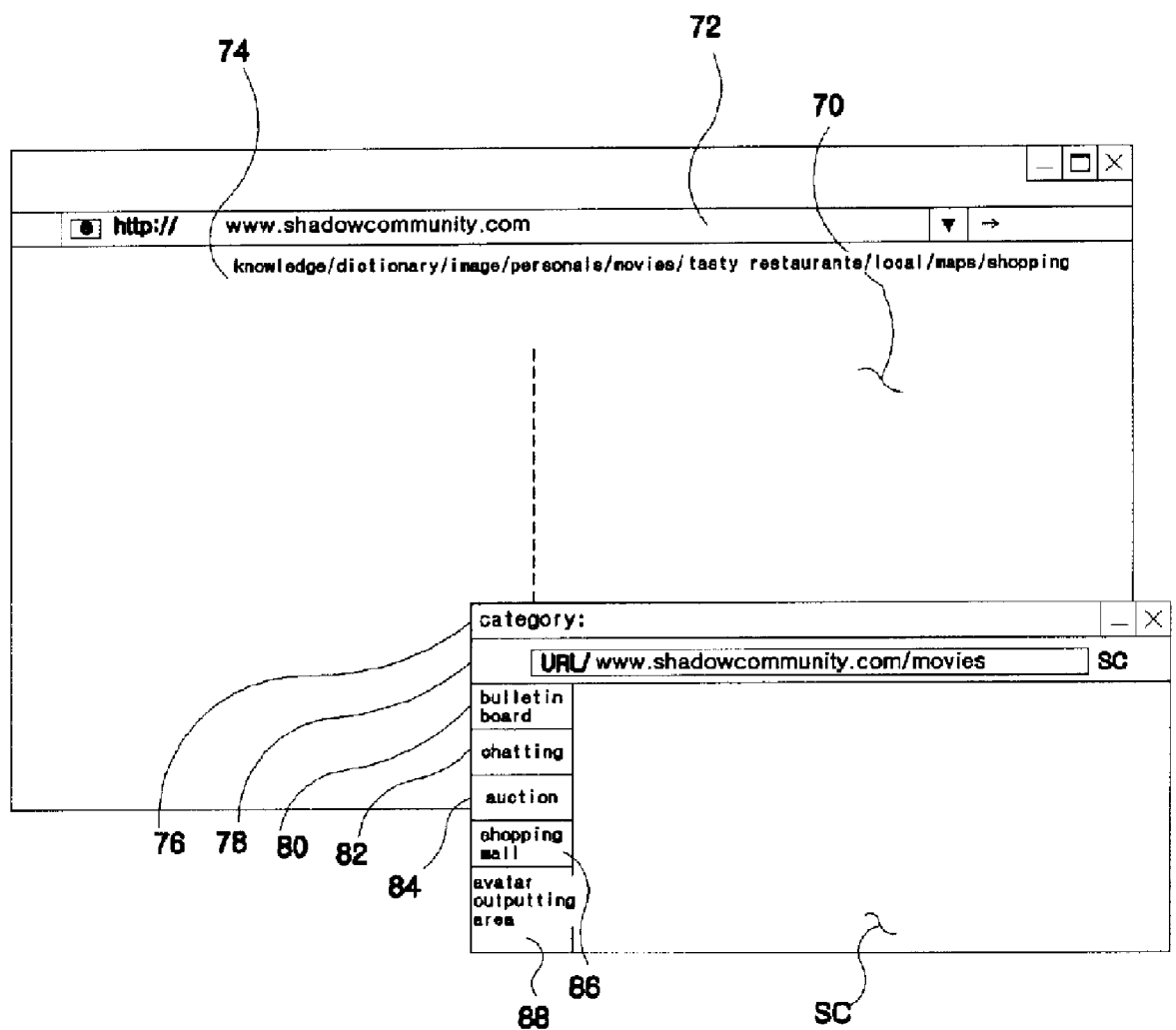
[Fig. 11]

SHADOW COMMUNITY PRODUCING SYSTEM MATCHED TO A VARIABLE AREA OF AN INTERNET BASE AND METHOD OF THE SAME

This application is a U.S. National Phase of International Patent Application Serial No. PCT/KR2006/001529, filed Apr. 24, 2006 which claims priority to Korean Patent Application No, 10-2005-0034189 filed Apr. 25, 2005.

TECHNICAL FIELD

The present invention relates to a shadow community producing system matched to a variable area of an internet base and a method of the same, which allows users connecting with unspecified web sites of an internet base to arbitrarily and automatically construct a community area in the web sites in real time, and allows a number of third parties connecting to the web sites to confirm creation information regarding the community and access to the community area, thereby enhancing convenience and consistency in information sharing.

BACKGROUND ART

In general, an internet means a data communication network that is able to perform a data communication through a Local Area Network (LAN) or a Public Switched Telephone Network (PSTN), and the like, based on a Transmission Control Protocol/Internet Protocol (hereinafter, referred to as TCP/IP) between a plurality of networks divided by the internet protocol (hereinafter, referred to as IP) address and a plurality of hosts having separate IP addresses provided in each of the networks. Here, the hosts mean a computer having a communication modem therein as well as a computer connected to a telephone, and that is able to facilitate two-way communication by only an inherent IP address given to each host.

In particular, the provision of services, such as electronic commercial transactions, various kinds of information, and various communities, etc., using an internet is increasing. As various communications related methods or service providing methods are advanced, there is an increasing desire from users, using an internet, to implement their own home pages or various spaces about themselves on a web site. Therefore, the respective internet service providing companies provide services, such as a web hosting, etc., or several communities to businesses or persons, and allocate spaces to users subscribed to them in order for the users to upload their home pages.

Further, as it is not for beginners to make their own home pages, the internet service providing companies have provided a service for making home pages for them, through a process that presents the users with the home pages previously made by the service providing companies, depending on the users tastes and that allows the users to select the designs of the home pages presented. Representative companies providing such a service may include www.netian.com, www.dreamwiz.com, and the like.

As such internet business becomes more developed, users can find material that they desire, from among vast quantities of material available on the internet, without any restrictions, such that they can access good quality information. In order for the users to do this, each of the internet service providing companies has provided a category search engine. The category search engine provides a Uniform Resource Locator (URL) link to allow the users to search categories by a field and by a subdivided depth by automatically creating the categories of the URL capable of obtaining all information.

DISCLOSURE OF INVENTION

Technical Problem

However, in case of the community producing company, it has a problem that since the community producing company has to construct a community in the web page provided from a business, the area or space required for constructing it is restricted.

Recently, there often appears the case that a community for communication between the users is provided in the main web pages of web sites of various kinds of electronic commercial transaction companies. A bulletin function, such as the community, in the web sites of various kinds of electronic commercial transaction companies, for user's comments, from users who have used the products of the corresponding web site, etc., gives indirect experience to consumers that have not used the products so that it functions to provide good information. Recently, there are some cases in which there is no community, such as the bulletin board on the web site of the electronic commercial transaction company, since its electronic commercial transaction can be hindered by comments from anti-users of the company or its product. Therefore, in case that there is no community on the web site of the electronic commercial transaction company, there is a problem that the consumers can never obtain user's comments, from user's who have used the products that they want to purchase, etc.

The problem consequently causes a disadvantage that the sellers selling products through the electronic commercial transaction web sites cannot obtain the information about consumer complaints and improvement facts with respect to their products.

Further, since even in the case of internet clubs, etc., of specific products, for example, such as cars, digital cameras, refrigerators, and the like, the web site selling the products does not allocate the community space for the internet clubs and the activity of the internet clubs is therefore made using a separate community producing space (for example, daum cafeteria provided in www.daum.net), there have been problems such that new consumers in the shopping malls do not know that such internet community spaces exist, and therefore it is impossible to activate the community as well as to share the shopping mall information.

Meanwhile, it is difficult for even the shopping malls selling various products to analyze and manage user's comments, from user's who have used the products, resulting in that during developing and researching the products, it is difficult to reflect the consumer opinions and obtain and manage the consumer information.

Technical Solution

The present invention is made in consideration of the problems of a prior art. It is an object of the present invention to provide a shadow community producing system matched to a variable area of an internet base and method of the same: allowing users connecting with unspecified web sites of an internet base to arbitrarily and automatically construct a community area in the web sites in real time, and allowing a number of third parties connecting to the web sites to confirm creation information regarding the community and access to the community area, thereby enhancing convenience and consistency in information sharing.

It is other object of the present invention to provide a shadow community producing system matched to a variable area of an internet base and method of the same: allowing users connecting with unspecified web sites of an internet base to automatically construct another community area arbitrarily connected with the web sites regardless of whether a separate community is constructed on the web sites; and allowing a number of third parties accessing to the web sites to confirm creation information of the community and access to the community area, thereby maintaining objectivity of information sharing.

It is another object of the present invention to provide a shadow community producing system matched to a variable area of an internet base and method of the same: allowing users connecting with unspecified web sites of an internet base to automatically construct another community area connected with the web sites regardless of whether a separate community is constructed on the web sites; and constructing a bulletin board, a chat room, an auction, a shopping mall, and/or an avatar, thereby commonly forming an electronic commercial transaction and a club community.

It is a yet another object of the present invention to provide a shadow community producing system matched to a variable area of an internet base and method of the same: previously sorting a plurality of categories of an internet base; and automatically constructing a community area for a directory sorting name in directory sort names sorted as any one of the categories, thereby sharing various kinds of information about the categories among users and providing a base area for an internet club.

It is still another object of the present invention to provide a shadow community producing system matched to a variable area of an internet base and method of the same: providing, when creating a shadow community area during shopping by accessing the specified shopping mall, a plurality of shopping malls information matched with categories having URL corresponding to the shopping malls; and providing a shopping area posting information about products of the same group as the URL industry, thereby making it possible to browse products of the same group without separate comparison and search.

ADVANTAGEOUS EFFECTS

As described above, a shadow community producing system matched to a variable area of an internet base and method of the same according to the present invention has advantages in that it allows users to create shadow communities matched with URLs on all areas accessible through the user's terminals regardless of web site producing companies, thereby sharing objective information with many and unspecified users; allows users to freely create and manage shadow communities for web sites not having communities, categories, and products; allows web site producing companies to collect consumer reactions or opinions in real time without having separate persons in order to obtain them; since it can easily establish internet clubs by a web site, by a category, and by a real product, it activates the internet clubs and does not need the movement of the users to the sites of separate internet clubs; in case that the users surf the sites of shopping malls, when creating the shadow communities, the users use the URL information about the group of products to recreate separate shopping data included in the shadow communities thereby allowing easy comparison of products of concern with the products displayed on the present web site.

BRIEF DESCRIPTION OF THE DRAWINGS

These and other features, aspects, and advantages of preferred embodiments of the present invention will be more fully described in the following detailed description, taken accompanying drawings. In the drawings:

FIG. 1 is a diagram showing a schematic construction of a shadow community producing system matched to a variable area of an internet base according to a first embodiment of the present invention;

FIG. 2 is a diagram showing a data transmission state of the shadow community producing system matched to a variable area of an internet base according to the first embodiment of the present invention;

FIG. 3 is a diagram showing a shadow community provided from the shadow community producing system matched to a variable area of an internet base according to the first embodiment of the present invention;

FIG. 4 is a block diagram showing a shadow community application structure installed in a user's terminal in the shadow community producing system matched to a variable area of an internet base according to the first embodiment of the present invention;

FIG. 5 is a block diagram showing a construction of a shadow community producing server matched to an unspecified accessing user of an internet base according to the first embodiment of the present invention;

FIGS. 6 to 8 are flow charts showing signal flows of the shadow community producing system matched to a variable area of an internet base according to the first embodiment of the present invention;

FIG. 9 is a diagram showing a data processing operation of a shadow community producing system matched to a variable area of an internet base time according to a second embodiment of the present invention;

FIG. 10 is a flow chart showing signal flow of the shadow community producing system matched to a variable area of an internet base according to the second embodiment of the present invention;

FIG. 11 is a diagram showing a schematic construction of the shadow community producing system matched to a variable area of an internet base according to a third embodiment of the present invention;

DESCRIPTIONS FOR KEY ELEMENTS IN THE DRAWINGS

A1 to An: USER'S TERMINAL
WPS1~WPSn: WEB SERVER
AWPS: AUCTION WEB SERVER
SWPS: SHOPPING MALL WEB SERVER
SCPS: SHADOW COMMUNITY PRODUCING SERVER

BEST MODE FOR CARRYING OUT THE INVENTION

Hereinafter, a first embodiment of the present invention will be described in more detail with reference to the drawings.

FIG. 1 is a diagram showing a schematic construction of a shadow community producing system matched to a variable area of an internet base according to a first embodiment of the present invention.

Referring to FIG. 1, the shadow community producing system matched to a variable area of an internet base according to the first embodiment of the present invention is a system that it allows users connecting with unspecified web sites of an internet base to arbitrarily and automatically construct an shadow community area in the internet base in real time, and allows a number of third parties connecting to the web sites to confirm creation information regarding the community and access to the community area, thereby enhancing convenience and consistency in information sharing.

Also, the shadow community producing system matched to a variable area of an internet base according to the first embodiment of the present invention is a system that allows users connecting with unspecified web sites of an internet base to automatically construct another community area arbitrarily connected with the web sites regardless of whether a separate community is constructed on the web sites; and allows a number of third parties connecting with the web sites to confirm creation information of the community and access to the community area, thereby maintaining objectivity of information sharing.

Further, the shadow community producing system matched to a variable area of an internet base according to the first embodiment of the present invention is a system that allows users connecting with unspecified main web sites of an internet base to automatically construct another community area connected with the web sites regardless of whether a separate community is constructed on the web sites; and constructing a bulletin board, a chat room, an auction, a shopping mall, an avatar, thereby commonly forming an electronic commercial transaction and a club community.

In other words, the shadow community producing system matched to a variable area of an internet base according to the first embodiment of the present invention is a system that allows the users to carry out community, that is, the users connected with the web sites from remote separate servers to execute community regardless of the presence of community, such as a bulletin board, a chat room, a Q&A, a mail, etc., in the web sites, in order to overcome the problems that it is difficult for the users to share various web sites information and product information due to the absence of the community in the plurality of web sites accessible through the user's terminals of an internet base, that is, the community of the web sites with a web server. Therefore, the shadow community can maintain objectivity about the information while sharing the information As a result, the shadow community producing system matched to a variable area of an internet base according to the first embodiment of the present invention constructs a shadow community only depending on the user's demands regardless of the community within each web site as well as the web site providing company, and allows an unspecified third party accessing to the web site as well as the unspecified third party not accessing to the web site to connect with the shadow community (SC) area.

For this, the shadow community producing system matched to a variable area of an internet base according to the first embodiment of the present invention is provided with user's terminals A1 to An with which shadow community applications (SC applications) is installed, wherein the shadow community application is an application that is connected with a shadow community producing server (SCPS) for allocating and providing a shadow community area in a plug-in scheme to automatically transmit the URL information of a specified web site previously accessed and authenticate the users.

Accordingly, if the users are connected with the specified web site through an Internet Explore for their terminals A1 to An and request the creation of the shadow community (SC) through the shadow community application (SC application) installed in the user's terminals A1 to An, the shadow community comprising a chatting means, which is able to post the web site information and discuss the web site information regardless of the community area of the web site, is created through the shadow community producing server (SCPS).

In other words, the shadow community producing server (SCPS) allocates the space for the shadow community area of the web site depending on the user's request. Since the shadow community is a space on a specific web site base, the shadow community applications installed in the respective user's terminals A1 to An extract the URL information together with shadow community creating signals to transmit them to the remote shadow community producing server (SCPS).

If in the state of any one user requesting the shadow community producing server (SCPS) to create the shadow community data for the web site, other users are connected with the shadow community producing server (SCPS) later, the shadow community producing server (SCPS) transmits the previously created shadow community data to the user to be output on the screen. Also, the shadow community data is a community, which is completely different from the community included in the menu terms of the web site.

Therefore, the shadow community producing system matched to a variable area of an internet base according to the first embodiment of the present invention is provided with a first to N web servers WPS1 to WPSn, which is able to be accessed through many and unspecified user's terminals A1 to An and post various products information, etc.

Meanwhile, the shadow community producing system matched to a variable area of an internet base according to the first embodiment of the present invention is provided with the shadow community producing server (SCPS), which can execute a category registration by a industry by receiving the shadow community (SC) area creating request signal and the URL information about the web site; be accessed through the user's terminals A1 to An by allocating a space for a database and creating the shadow community (SC); and provide and manage various bulletin board posters to register them.

At this time, the shadow community application downloaded and installed to and in the user's terminals A1 to An and when the users executes the download, they should receive the account of ID and password through a member joining for the shadow community producing server (SCPS). Accordingly, the shadow community application installed in the user's terminals A1 to An authenticates the users through the ID and password and connects to the shadow community producing server (SCPS) in a plug-in scheme such as a hot key, etc.

Meanwhile, the shadow community producing server (SCPS) is provided with a first and second databases DB1 and DB2, which store user authentication information, previously created shadow community information, web site information with which the corresponding shadow community is established, and category information about the web site, wherein it is connected with a separate auction web server (AWPS) and a shopping mall web server (SWPS) to post auction information and shopping mall information provided from the auction web server (AWPS) and a shopping mall web server (SWPS) to each shadow community data and create the shadow community data.

FIG. 2 is a diagram showing a data transmission state of the shadow community producing system matched to a variable area of an internet base according to the first embodiment of the present invention.

First, the shadow community producing system matched to a variable area of an internet base according to the first embodiment of the present invention should allow the first user to access to the shadow community producing server (SCPS) through the user's terminals A1 to An, and then download the shadow community application (SC application) from the shadow community producing server (SCPS) and install it in the user's terminals A1 to An.

The shadow community application (SC application) provides a plug-in button to connect the user's terminals A1 to An to the shadow community producing server (SPSC) in real time, and at the same time, automatically transmits the URL information about the web site of an internet base connected by the user's terminals A1 to An to the shadow community producing server (SCPS) and processes it.

Therefore, if the shadow community application is connected with the web site provided through the user's terminals A1 to An of the first user by the specific web server WPS1, the shadow community application installed in the user's terminals A1 to An automatically extracts the URL information and the category information from the web site provided by the web server (WPS1). At this time, in case that the category information does not exist since the web site is not registered with the searching portal, etc., the shadow community producing server (SCPS) sorts as an unregistered processing once and executes a separate category registering work later.

The category registering work executed in the shadow community producing server (SCPS) prepares a new category table within the data of the shadow community producing server (SCPS) previously constructed, wherein the category table may consist of a sequential category from the top level (Levelid0) to the lower level (Levelid1, . . . , Levelid5). Each category (Levelid0, . . . , Levelid5) may include a level name, a creation date by the user, the URL information included in the level. Each level may consist of an integer data. Further, the category table may include a name and a creation date for each category, wherein the category name is configured of a character string of 120 bytes.

Accordingly, in the state that the shadow community application installed in the user's terminals A1 to An extracts and holds the URL information and the category information about the web site, the first user generates the shadow community (SC) creating signal through the shadow community application of the user's terminals A1 to An.

Then, the shadow community application of the user's terminals A1 to An is automatically connected with the shadow community producing server (SCPS) and transmits the URL information and the category information about the web site to the shadow community producing server (SCPS).

Then, the shadow community producing server (SCPS) searches whether the shadow community of the web site exists or not by using the databases DB1 and DB2, and if not, allocates the shadow community area for the web site and provides it in a pop-up window form. That is, the shadow community producing server (SCPS) allocates the database to open the shadow community data to be connected by the third party of an internet base.

If the shadow community data for the web site is previously created and registered, the shadow community producing server (SCPS) readably opens the shadow community data through the user's terminals A1 to An.

In the state, the first user can write user's comments, from users who have used the products on the shadow community (SC) area created in the shadow community producing server (SCPS) through the user's terminals A1 to An, and the shadow community producing server (SCPS) registers the data written by the first user and updates the database so that the third party can read it.

Meanwhile, the shadow community area created by the shadow community producing server (SCPS) is divided into a bulletin area, a chatting area, a shopping mall area, an avatar outputting area, wherein the shadow community producing server (SCPS) is processed by sorting a database by each area divided in a specific shadow community Accordingly, the first user connected with the shadow community producing server (SCPS) participates in a chatting, an auction, and a shopping mall through the shadow community area created in the shadow community producing server (SCPS).

In the state, the second user is connected with the web site that is connected with the first user and creates the shadow community. When requesting to create the shadow community of the web site in the shadow community producing server (SCPS) by activating the shadow community application built in the user's terminals A1 to An, the shadow community producing server (SCPS) informs the user's terminals A1 to An that the shadow community area for the web site is previously created, and provides the shadow community. Accordingly, the second user is able to chat with the first user through the shadow community area.

FIG. 3 is a diagram showing the shadow community provided from a shadow community producing system matched to a variable area of an internet base according to the first embodiment of the present invention.

Referring to FIG. 3, in case of installing the shadow community application (SCA) in the user's terminals A1 to An as shown in FIG. 3, the shadow community provided from the shadow community producing system matched to a variable area of an internet base according to the first embodiment of the present invention outputs a plug-in button by outputting an internet explore on the screen so that it can be connected with the shadow community producing server (SCPS).

That is, if the user is connected with the specific web site through the terminals A1 to An by installing the shadow community application (SCA), an internet explore browser to which a main page 2 outputting the menu of the web site is output comprises an outputting column 4 outputting the URL information of the web site, wherein the upper of the URL outputting column 4 is provided with a button outputting column having various buttons and the upper of the button outputting column is provided with a menu window 6 storing a plurality of menus.

At this time, when connecting with the specific web site through the terminals A1 to An installed with the shadow community application (SCA), the internet explore browser outputs the SC plug-in button on the screen, which is activated to drive the shadow community application (SCA). The SC plug-in button can be output on the browser in various forms, wherein the SC plug-in button can be output on the menu window 6 and the SC plug-in button 8 can be formed on the button outputting column in a separate form. Also, the SC plug-in button 12 may be constructed to be included in a mouse menu tool 10 output by depressing the right button of the mouse. That is, the plug-in button 12 is mounted in an interface form to be connected with the mouse program. All the schemes constructing the specific button are well known in the prior art, and the detailed description thereof will therefore be omitted.

Accordingly, the user can be connected with the shadow community producing server (SCPS) by clicking the SC plug-in button in real time while surfing the web site on the internet base through the web browser of the user's terminals A1 to An.

If the user clicks the SC plug-in button to create the shadow community for the web site by connecting with the shadow community producing server (SCPS), the shadow community application extracts the URL information and the directory information of the web site and transmits them to the shadow community server SCPS.

At this time, it searches whether the previously created shadow community data for the web site exists or not in the shadow community producing server (SCPS) and if not, creates the shadow community data connected with the URL of the web site and opens the data to be accessed by the many and unspecified users. Then, the shadow community (SC) area is output in the pop-up window form as shown in FIG. 3.

The category registering information 14 sorted from the shadow community producing server (SCPS) is output to the shadow community (SC) area through the portal, etc., wherein the lower of the shadow community area is posted with the URL information. Also, a bulletin board 18, a chat room 20, an auction 22, a shopping mall 24, and an avatar outputting area 26 are selected and activated in the shadow community (SC) area. Accordingly, the user can automatically posts the contents about the web site or the contents about products selling in the web site on the bulletin board regardless of whether the community area exists or not in the web site, and share the information by chatting with other users connecting with the web site at the same time zone.

At this time, the output of the shadow community accessing button using the internet explore, that is, the shadow community driving button is not limited to only the internet explore, but all the shadow community driving buttons are output from various web browsers accessing to the specific web sites on the internet base so that the URL information of the web site and the shadow community creating request signal can be transmitted to the shadow community producing server (SCPS).

FIG. 4 is a block diagram showing a shadow community application structure installed in a user's terminal in the shadow community producing system matched to a variable area of an internet base according to the first embodiment of the present invention.

Referring to FIG. 4, the user's terminals A1 to An in which the shadow community application 34 is installed comprises a communication module 30, which can transmit and receive data by connecting with a remote terminal or a server in an internet base through a communication connecting means such as a modem, etc., likewise a general PC. It also comprises various processors 32 executing the general PC functions.

Also, the user's terminals A1 to An under the shadow community producing system matched to a variable area of an internet base according to the first embodiment of the present invention comprises the shadow community application 34, which is automatically connected with the shadow community producing server (SCPS) and automatically extracts and transmits the URL of the web site output on the web browser, wherein the shadow community application 34 is provided with a URL transmitting processor 34a, which extracts the URL information of the web site connected with the user's terminals A1 to An and transmits it to the shadow community producing server (SCPS), a user authentication processor 34b for authenticating by comparing the user authentication with the account data of the shadow community producing server (SCPS) through the previously accounted ID and password, a write processor driving a write mode for the bulletin board and the chatting column of the shadow community, and a chatting processor 34d supporting the transmit and receive of data and outputting it on the screen in real time.

Also, the user's terminals A1 to An is provided with a controller 36, which controls to generate the shadow community creating request signal to the shadow community producing server (SCPS) by activating the shadow community application 34 and by managing the shadow community data creating request signal and extracting and autotransmitting the URL of the connection web site through the shadow community application 34 while controlling each processor executing the general PC functions an inherent PC functions.

FIG. 5 is a block diagram showing a construction of a shadow community producing server matched to an unspecified accessing user of an internet base according to the first embodiment of the present invention.

Referring to FIG. 5, the shadow community producing server (SCPS) is configured of a communication module, a key inputting unit, a user authentication processor, a URL management processor, an auction management processor, a category creation processor, an SC creating processor, a bulletin board posters updating processor, a shopping mall management processor, a user information DB, a URL DB by a category, a previously creating SC information DB, an SC bulletin board posters DB, an auction DB, a shopping mall DB, and a controller.

Reference numeral 38 represents a communication module that can transmit and receive data by being connected with a remote terminal or a server of an internet base through a communication connecting means such as a modem, etc. Reference numeral 40 represents a key inputting unit that generates key signals for establishing each processor by a sever manager.

Reference numeral 42 represents a user authentication processor that is connected with a user authentication processor 34b provided in the user's terminals A1 to An to execute the user authentication by comparing the previously accounted ID and password with the currently input ID and password. Reference numeral 44 represents a URL management processor that judges whether the URL pre-stored in the server exists or not using the URL information automatically transmitted through the connection URL transmitting processor 34a provided in the user's terminals A1 to An, and stores and manages the URL information.

Reference numeral 46 represents an auction management processor that receives and posts auction information in the server and processes a selling management or connects to an external auction site and relays only its settlement processing. Reference numeral 48 represents a category creation processor that is connected with the URL management processor 44 to execute a category sort of the URL newly transmitted, wherein in case of registering the URL with the internet portal, the category creation processor extracts the category information of the internet portal and stores and manages it.

Reference numeral 50 represents an SC creating processor that is constructed to allow a shopping mall, an auction and an avatar, etc, respectively, to be shared by the shadow community by each URL and a bulletin board and a chatting, respectively, to be separated by each URL, and creates the shadow community data to be output on the screen in the pop-up window form.

Reference numeral 52 represents a bulletin board posters updating processor that is connected with the SC creating processor 50 to update and process the bulletin board posters posted on the shadow community (SC) area by each URL. Reference numeral 54 represents a shopping mall management processor that executes the publication, the purchase, the settlement, and the dispatch management of the products of the shopping mall posted on the shadow community (SC) area.

Reference numeral 56a represents a user information DB for storing the user's personal information. Reference numeral 56b represents a URL DB by a category for storing URL information by each category. Reference numeral 56c represents a previously creating SC information DB for storing the shadow community data created by each URL.

Reference number 56d represents an SC bulletin board posters DB for storing a bulletin board posters data to be preserved in the shadow community data by each URL. Reference numeral 56e represents an auction DB for storing the auction data such as a bid, a successful bid, and an auction products, etc., through an auction window on which the shadow community data is posted. Reference numeral 56f represents a shopping mall DB for storing the shopping data such as a product posting, a purchase, a settlement, dispatch, purchasing decision, a selling charge transfer, etc, made through the window of the shopping mall on which the shadow community data is posted.

Reference numeral 58 represents a controller that processes the URL information, the category information and the shadow community data creating request signal transmitted from the shadow community application 34 provided in the user's terminals A1 to An to create the shadow community by each URL and generates the control signal to execute a bulletin board posters updating processing, a shopping mall management, and an auction management.

The function and acting of the shadow community producing system matched to a variable area of an internet base according to the first embodiment of the present invention constructed as above will be described in more detail with reference to the accompanying drawings.

FIGS. 6 to 8 are flow charts showing signal flows of the shadow community producing system matched to a variable area of an internet base according to the first embodiment of the present invention.

First, FIG. 6 is a flow chart showing a signal flow for the download and installation of the shadow community application 34 and the creation of the shadow community data. If a user is connected with the shadow community producing server (SCPS) using the user's terminals A1 to An, the shadow community producing server (SCPS) compares and judges the ID pre-stored whether the user is a member or not.

If the user is not a member, the shadow community producing server (SCPS) registers personal information input by a member and give the account of the ID and password. The shadow community application 34 provided from the shadow community producing server (SCPS) is downloaded and installed in the user's terminals A1 to An.

When completing the installation of the shadow community application 34, the user inputs his ID and password through the shadow community application 34 and then makes a log in.

And, if the user is connected with any specified web site using the user's terminals A1 to An, on the web browser output on the screen by the shadow community application 34 is output the plug-in activation button, wherein if the button is clicked, the shadow community application 34 is driven to extract the URL information and the category information of the web site and transmit them to the shadow community producing server (SCPS).

Then, the shadow community producing server (SCPS) searches and judges whether the shadow community for the URL exists. If so, it extracts the shadow community data from the database to transmit it to the user's terminals A1 to An, thereby outputting it on the screen.

If the judging result in the shadow community producing server (SCPS) is that the shadow community data does not exist, the shadow community producing server (SCPS) allocates the database therein to create the shadow community data by the URL and processes the URL as the category unregistered. The category registration processing becomes a registration processing by a manager later.

Then, the user makes a desired writing on the bulletin board of the shadow community area through the user's terminals A1 to An and the updating information is transmitted and updated to the shadow community producing server (SCPS) through the shadow community application 34 installed inside of the user's terminals A1 to An.

FIG. 7 is a flow chart showing a chatting process through the shadow community area. First, while the user writes on the bulletin board, etc., through the shadow community (SC) area created and extracted by the process in the FIG. 6, the user can selectively output the information of the chatting window on the screen, wherein a plurality of chat rooms can be created in the chatting window. If the user selects any one of the chat rooms and generates selection signals from the user's terminals A1 to An, the user enters the chat room by driving the shadow community application 34 to make a chatting. Accordingly, the character data input by the user and the character data input by other users are output on the screen.

If the user intends to terminate the shadow community area, the user clicks the closing button of the shadow community (SC) area to close the window.

FIG. 8 is a diagram showing a process using a shopping mall through the shadow community (SC) area. The process of an auction is similar to the process of the shopping mall and the description thereof will be omitted.

First, while the user writes on the bulletin board, etc., through the shadow community (SC) area created and extracted by the process in the FIG. 6, if the user can selectively click the shopping mall, the product information associated with the shopping mall is output on the screen in the shadow community (SC) area. In the state, if the user generates the purchasing signal for the specific products, the shopping mall settling means installed in the shadow community application 34 is activated and pays a charge on the products, and the settlement signal is transmitted to the shadow community producing server (SCPS).

Then, the shadow community producing server (SCPS) dispatches the products, and in the state of completing the dispatch, the shadow community producing server (SCPS) requests that the shadow community application 34 of the user determines the purchase of the products.

According to the foregoing, if the user makes the purchasing decision of the products through the shadow community application 34, the shadow community producing server (SCPS) transfers a selling charge to the seller. If the user generates a refunding signal of the products, the shadow community producing server (SCPS) returns the price paid. Since the shadow community producing system is not based on a e-mail, but is based on the application, the settlement and dispatch processing of the shopping mall and the acknowledge of the purchasing decision, and the like can be made very conveniently.

MODE FOR THE INVENTION

Hereinafter, a second embodiment of the present invention will be described in more detail with reference to the drawings.

FIG. 9 is a diagram showing a data processing operation of a shadow community producing system matched to a variable area of an internet base time according to the second embodiment of the present invention.

Referring to FIG. 9, the shadow community producing system matched to a variable area of an internet base according to the second embodiment of the present invention is a system that it provides, when creating a shadow community area during shopping by accessing the specified shopping mall of an internet base, a plurality of shopping malls information matched with categories having URL corresponding to the shopping malls or provides a shopping area posting information about selling products of the same group as the URL industry, thereby making a prompt shopping of products of the same group possible without separate comparison and search.

In other words, in the shadow community producing system matched to a variable area of an internet base according to the second embodiment of the present invention, when a user wishes to buy products by connecting with specified web sites of an internet base (electronic shopping mall sites), a shadow community application 34 installed in the user's terminals A1 to An transmits URL information of the web site to the shadow community producing server (SCPS), resulting in that the URL information includes category sorting data such as http://price.empas.com/ . . . refrigerator, when selecting a specific product.

Therefore, the shadow community application 34 installed in the user's terminals A1 to An transmits the URL information including the product information to the shadow community producing server (SCPS), and the shadow community producing server (SCPS) remixes the shopping mall information included in the shadow community (SC) area created by using the product information included in the URL information.

That is, when the product "refrigerator" is included in the URL information provided from the user's shadow community application 34, the shadow community producing server (SCPS) allows it to include in the shopping mall information 24 of the shadow community (SC) area creating the information of "refrigerator" of other company's product or our company's product. Therefore, when the user clicks the shopping mall information 24' included in the created shadow community (SC) area, a separate pop-up window 66 outputting the information about the same group of products as the product having been surfing in the URL web site is output. Therefore, a prompt comparison of the products as well as user's comments, from users who have used the products can be stated in the shadow community (SC) area through the comparison information.

The function and the operation of the shadow community producing system matched to a variable area of an internet base according to the second embodiment of the present invention will be described in detail with reference to the accompanied drawings.

FIG. 10 is a flow chart showing signal flow of a shadow community producing system matched to a variable area of an internet base according to the second embodiment of the present invention.

First, when the user searches products for shopping in the web sites connected with any specific web sites by using the user's terminals A1 to An, a plug-in active button is output on the web browser to be output on the screen by the shadow community application 34 constituted in the user's terminals A1 to An. Therefore, when the user clicks the button, the shadow community application 34 is driven to extract the URL information and the category information from the web site, transmitting them to the shadow community producing server (SCPS).

Then, the shadow community producing server (SCPS) searches and judges whether the shadow community of the web site exists or not. If the shadow community data for the web site exists, it makes a screen output possible by transmitting the shadow community data from the database to the user's terminals A1 to An.

As a result of judgment in the shadow community producing server (SCPS), if the shadow community data for the web site does not exist, the shadow community producing server (SCPS) allocates database inside thereof to create shadow community data per the URL, sorts the URL as an unregistered process of category, and allows a following manager to register the category of the URL.

At this time, if the user is searching by selecting a specific product in shopping mall of the web site, the product information is included in the URL of the web site. The shadow community application 34 installed in the user's terminals A1 to An extracts the URL including the product information and transmits it to the shadow community producing server (SCPS).

Then, the shadow community producing server (SCPS) extracts the product information of the product group by using the product information included in the URL information, constructs shopping mall information comprising the product information, and creates shadow community data posting the shopping mall information to readably construct it in the database DB. Therefore, the user posts information such as user's opinions or comments, from users who have used the products, etc. on a bulletin board so that it can be shared by unspecified users through the shopping mall information posted in the shadow community (SC) area.

Hereinafter, a third embodiment of the present invention will be described in detail with reference the accompanied drawings.

FIG. 11 is a diagram showing a schematic construction of a shadow community producing system matched to a variable area of an internet base according to a third embodiment of the present invention.

Referring to FIG. 11, the shadow community producing system matched to a variable area of an internet base according to the third embodiment of the present invention is a system to previously sort a plurality of categories of an internet base and to automatically construct a community area for a directory sorting name in directory sorting names sorted as any one of the categories, thereby sharing various kinds of information about the categories among users and providing a base area for an internet club.

In other words, the shadow community area that the user requests it as the shadow community producing server (SCPS) through the shadow community application 34 installed in the terminals A1 to An is not limited only in web sites but the shadow community constructing area can be extended into a specific category and be narrowed into a specific product.

For example, the user can request the shadow community producing server (SCPS) to create a shadow community during the category searches by being connected with a plurality of categories sorts previously sorted in the shadow community producing server (SCPS), that is, the directory sort names, respectively, without connecting with a specific web site, and can request a creation of a shadow community for the product in a state that a specific product is selected in a specific shopping mall.

That is, the shadow community proposed in the present invention is a system to automatically extract URL information requesting a creation of a shadow community through the shadow community application 34 installed in the user's terminals A1 to An, and the shadow community producing server (SCPS) is a system to automatically create and to open a shadow community data through the URL information, resulting in that a shadow community data can be created in any area of web base.

FIG. 11 is a diagram creating a shadow community (SC) area in a category area previously sorted in the shadow community producing server (SCPS), and the main page 70 of the shadow community producing server (SCPS) has a plurality of category classifications for easiness of search. That is, a category classification 74 is made such as "knowledge/dictionary/images/personals/movies/tasty restaurants/local/maps/shopping/digital camera" therefore the user can request a creation of a shadow community area by selecting any one category (for example, movies) of such a category classification 74.

In other words, since the user can request a creation of a shadow community through the user's terminals A1 to An, the shadow community application installed in the user's terminals A1 to An automatically extracts URL information including the category information for which the shadow community producing server (SCPS) provides. At this time, in a state that the user selects category information, the URL information 72 is made in a form of http://www.shadowcommunity.com/movies, and the URL information 72 extracted is thus to be transmitted to the shadow community producing server (SCPS).

And then, the shadow community producing server (SCPS) searches whether the shadow community of the category exists or not by using the databases DB1 and DB2, and if not, allocates the shadow community area for the category and provides it in a pop-up window form. That is, the shadow community producing server (SCPS) allocates the database to open the shadow community data to be connected by the third party of an internet base.

If the shadow community data for the web site is previously created and registered, the shadow community producing server (SCPS) readably opens the shadow community data through the user's terminals At to An.

In the state, the user can write opinions after using products on the shadow community (SC) area created in the shadow community producing server (SCPS) through the user's terminals A1 to An, and the shadow community producing server (SCPS) registers the data written by the user and updates the database so that the third party can read it. That is, in case that the category is "movies" information of various movies are output, and reviews of each movie, etc. are posted in the shadow community (SC) area, enabling many and unspecified users to share the review information.

Meanwhile, the shadow community area created by the shadow community producing server (SCPS) is divided into a bulletin area 80, a chatting area 82, an auction area 84, a shopping mall area 86, an avatar outputting area 88, wherein the shadow community producing server (SCPS) is processed by sorting a database by each area divided in a specific shadow community.

Also, in the shadow community producing system matched to a variable area of an internet base according to the third embodiment of the present invention, the user can create a shadow community by selecting a category, for example, "digital camera", in a plurality of category sort names previously sorted and provided by the shadow community producing server (SCPS). Therefore, the lower of the category sort name such as "digital camera" includes URL of the web sites of a plurality of digital camera providing companies and the upper of the category sort name creates a shadow community, enabling many and unspecified users to post various digital cameras information and to share digital camera selling companies information so that the users can use them very conveniently.

INDUSTRIAL APPLICABILITY

As described above, a shadow community producing system matched to a variable area of an internet base and method of the same according to the present invention has advantages in that it allows users to create shadow communities matched with URLs on all areas accessible through the user's terminals regardless of web site producing companies, thereby sharing objective information with many and unspecified users; allows users to freely create and manage shadow communities for web sites not having communities, categories, and products; allows web site producing companies to collect consumer reactions or opinions in real time without having separate persons in order to obtain them; since it can easily establish internet clubs by a web site, by a category, and by a real product, it activates the internet clubs and does not need the movement of the users to the sites of separate internet clubs; in case that the users surf the sites of shopping malls, when creating the shadow communities, the users use the URL information about the group of products to recreate separate shopping data included in the shadow communities thereby allowing easy comparison of products of concern with the products displayed on the present web site.

Although the present invention has been described in connection with the exemplary embodiments illustrated in the drawings, it is only illustrative. It will be understood by those skilled in the art that various modifications and equivalents can be made to the present invention. Therefore, the true technical scope of the present invention should be defined by the appended claims.

The invention claimed is:

1. A shadow community producing system matched to a variable area of an internet base, comprising:
   a user's terminal installed with a shadow community application downloaded from a remote shadow community producing server and comprising a communication means such as a modem, etc., wherein the shadow community application provides user authentication information to the server and generates URL information and category information of a web site surfed by the user and a shadow community creating signal;
   a plurality of web servers providing the web site accessible in an internet base through the user's terminal; and,
   a shadow community producing server receiving a shadow community (SC) area creating request signal and the URL information of the web site transmitted through the shadow community application of the user's terminal to search and judge whether the previously created shadow community for the web site exists or not so that the shadow community data by the web site is output; in case of the absence of the previously created shadow community, allocating a database space to create the shadow community (SC) so that it can be accessed through the remote user's terminal; and providing and managing various bulletin board posters to register them, thereby allocating the database of the shadow community producing server in real time depending on the user's demands for the web site not having the community to construct the shadow community area.

2. The shadow community producing system matched to a variable area of an internet base as claimed in claim 1, wherein the shadow community producing server further comprises a database storing the previously created shadow community information and the web site information with which the shadow community is established, and the category information of the web site.

3. The shadow community producing system matched to a variable area of an internet base as claimed in claim 1, wherein the shadow community application installed in the user's terminal is connected with an Internet Explore application or various kinds of web browsers to output a driving button as a separate plug-in button to the web browsers.

4. The shadow community producing system matched to a variable area of an internet base as claimed in claim 3, wherein the driving button of the shadow community application can be included to be output in any one area of a menu window of the web browser, a separate hot key form, a mouse menu tool.

5. The shadow community producing system matched to a variable area of an internet base as claimed in claim 1, wherein the shadow community application included in the user's terminal is provided with a connection URL transmitting processor which extracts the URL information of the web site connected with the user's terminal and transmits it to the shadow community producing server; a user authentication processor for authenticating by comparing the user authentication with the account data of the shadow community producing server through the previously accounted ID and password; a write processor driving a write mode for the bulletin board and the chatting column of the shadow community; and a chatting processor supporting the transmit and receive of data and outputting it on the screen in real time.

6. The shadow community producing system matched to a variable area of an internet base as claimed in claim 1, wherein, the shadow community producing server comprises a communication module that can transmit and receive data by connecting with a remote terminal or a server in an internet base through a communication connecting means such as a modem, and the like; a key inputting unit that generates key signals for establishing each processor by a sever manager; a user authentication processor that is connected with a user authentication processor provided in the user's terminal to execute the user authentication by comparing the previously accounted ID and password with the currently input ID and password; a URL management processor that judges whether the URL pre-stored in the server exists using the URL information automatically transmitted through the connection URL transmitting processor 34a provided in the user's terminal, and stores and manages the URL information; an auction management processor that receives and posts auction information in the server and processes its selling management or connects to an external auction site and relays only its settlement processing; a category creation processor that is connected with the URL management processor to execute a category sort of the URL newly transmitted; an SC creating processor that is constructed to allow a shopping mall, an auction and an avatar, etc., respectively, to be shared by the shadow community by each URL, and a bulletin board and a chatting, etc., respectively, to be separated by each URL, and creates the shadow community data to be output on the screen in the pop-up window form; a bulletin board posters updating processor that is connected with the SC creating processor 50 to update and process the bulletin board posters posted on the shadow community (SC) area by each URL; a shopping mall management processor that executes the publication, the purchase, the settlement, and the dispatch management of the products of the shopping mall posted on the shadow community (SC) area; a user information DB for storing the user's personal information; a URL DB by a category for storing URL information by each category; a previously creating SC information DB for storing the shadow community data created by each URL; an SC bulletin board posters DB for storing a bulletin board posters DB to be preserved in the shadow community data by each URL; an auction DB for storing the auction data such as a bid, a successful bid, and an auction products, etc., through an auction window on which the shadow community data is posted; a shopping mall DB for storing the shopping data such as a product posting, a purchase, a settlement, dispatch, purchasing decision, a selling charge transfer, etc, made through the window of the shopping mall on which the shadow community data is posted; and a controller that processes the URL information, the category information and the shadow community data creating request signal transmitted from the shadow community application provided in the user's terminal to create the shadow community by each URL and generates the control signal to execute a bulletin board posters updating processing, a shopping mall management, and an auction management.

7. The shadow community producing system matched to a variable area of an internet base as claimed in claim 1, wherein the shadow community is connected with the URL of the specific web site to represent an open data that is created through a data space provided from the remote shadow community producing server regardless of the web site and can be accessed by many and unspecified users.

8. The shadow community producing system matched to a variable area of an internet base as claimed in claim 1, wherein the shadow community data posts a bulletin board, a chatting, an auction, a shopping mall, and an avatar outputting area, respectively, for the web site therein.

9. A shadow community producing system matched to a variable area of an internet base, comprising:
  a user's terminal installed with a shadow community application downloaded from a remote shadow community producing server and comprising a communication means such as a modem, etc., wherein the shadow community application provides user authentication information to the server and generates URL information and category information of a web site surfed by the user and a shadow community creating signal;
  a plurality of web servers providing the web site accessible in an internet base through the user's terminal; and,
  a shadow community producing server receiving a shadow community (SC) area creating request signal and the URL information of the web site transmitted through the shadow community application of the user's terminal to register a category registration by industry for the web site; allocating a database space to create the shadow community (SC) so that it can be accessed through the remote user's terminal; providing and managing various bulletin board posters to register them; and if the URL information transmitted from the user's terminal includes information about products or the group of products, allowing the shopping mall information of the same group of products to be included in the shadow community area, thereby allocating the database of the shadow community producing server in real time depending on the user's demands for the web site not having the community to construct the shadow community area.

10. A shadow community producing system matched to a variable area of an internet base, comprising:

a user's terminal installed with a shadow community application downloaded from a remote shadow community producing server and comprising a communication means such as a modem, etc., wherein the shadow community application provides user authentication information to the server, allows the user to select any one of a plurality of category sort names previously sorted in the community producing server and post product information sold in web sites sorted by a plurality of subordinate concepts or other web sites, and generates category selecting information and a shadow community creating signal to output the information on a screen;

a web server providing our company information and selling product information to sort the category in the shadow community producing server; and, a shadow community producing server receiving a specific category sort names selecting signal and a shadow community (SC) area creating request signal transmitted through the shadow community application of the user's terminal to search and judge whether the previously created shadow community for the category exists or not so that the shadow community data by the category is output; in case of the absence of the previously created shadow community, allocating a database space to create the shadow community (SC) so that it can be accessed through the remote user's terminal; and providing and managing various bulletin board posters to register them, thereby allocating the database of the shadow community producing server in real time depending on the user's demands for the category or directory sort name not having the community to construct the shadow community area.

* * * * *